L. M. DIETERICH.
VARIABLE POWER TRANSMITTING AND CONTROLLING MECHANISM.
APPLICATION FILED MAR. 18, 1908.

1,063,244.

Patented June 3, 1913.

9 SHEETS—SHEET 1.

WITNESSES

INVENTOR
Ludwig M. Dieterich
BY
ATTORNEY

L. M. DIETERICH.
VARIABLE POWER TRANSMITTING AND CONTROLLING MECHANISM.
APPLICATION FILED MAR. 18, 1908.
1,063,244.
Patented June 3, 1913.
9 SHEETS—SHEET 3.
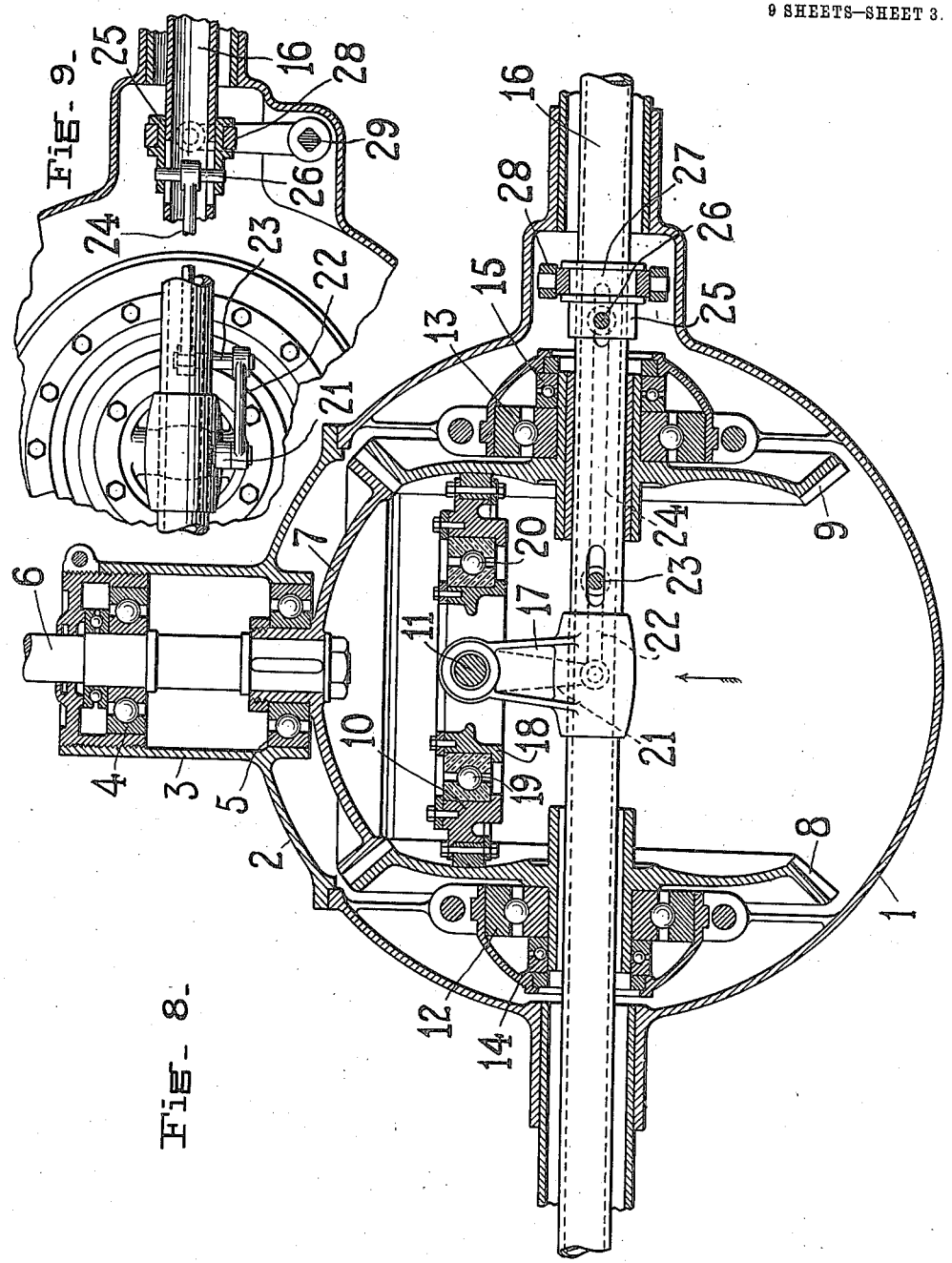
WITNESSES
INVENTOR
Ludwig M. Dieterich
BY
ATTORNEY L. M. DIETERICH.
VARIABLE POWER TRANSMITTING AND CONTROLLING MECHANISM.
APPLICATION FILED MAR. 18, 1908.

1,063,244.

Patented June 3, 1913.

WITNESSES

INVENTOR
Ludwig M. Dieterich
BY
ATTORNEY

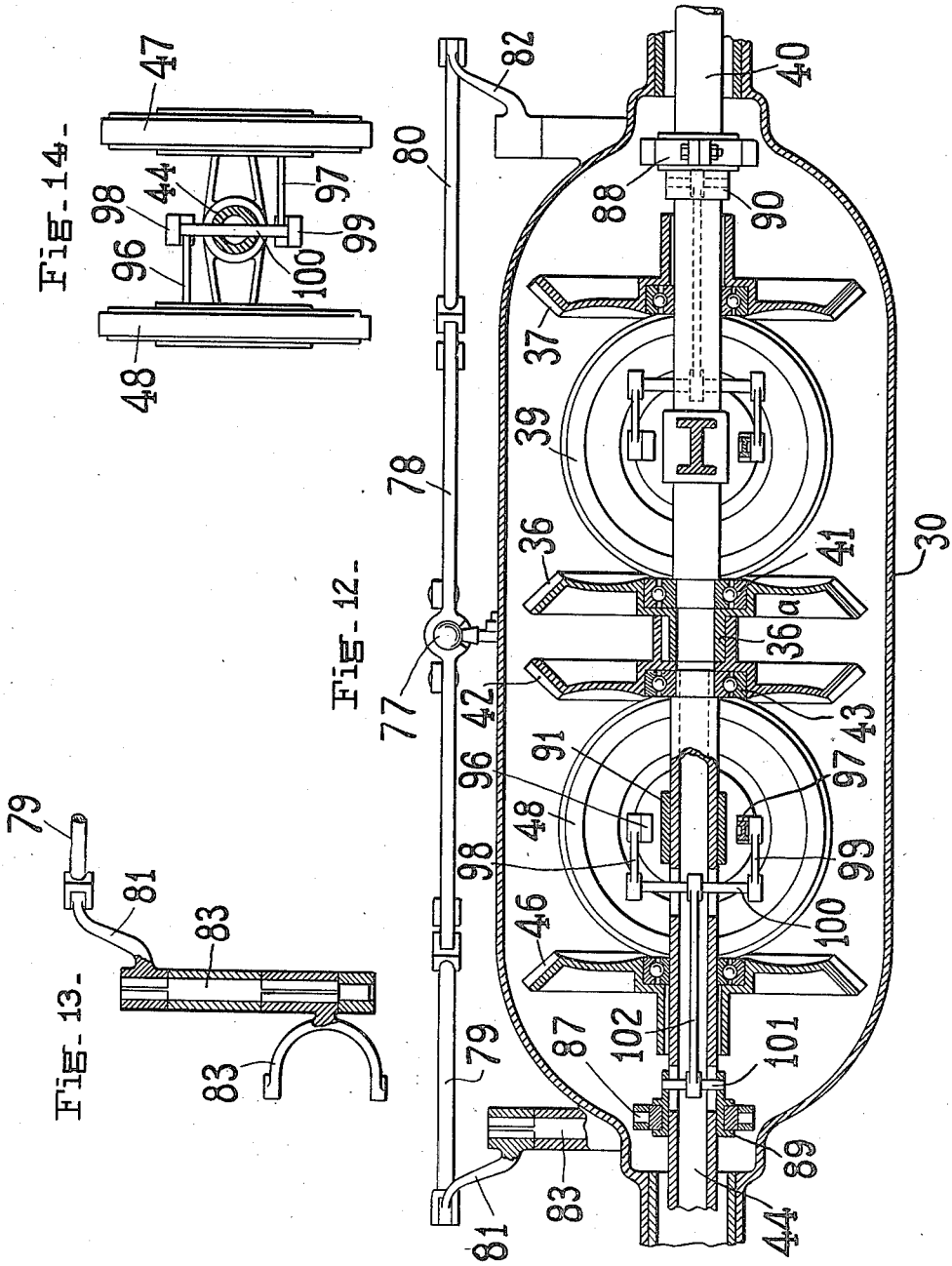

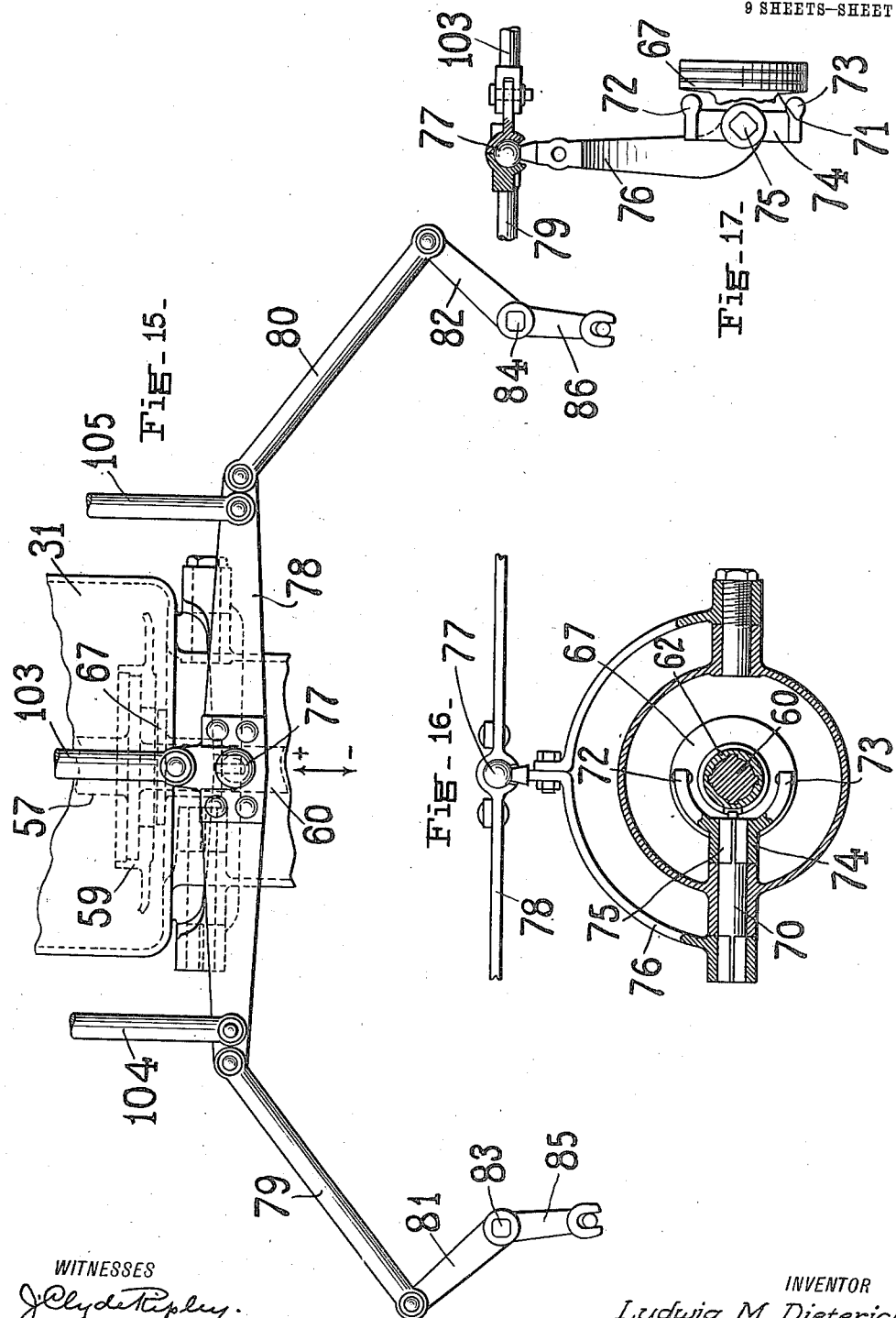

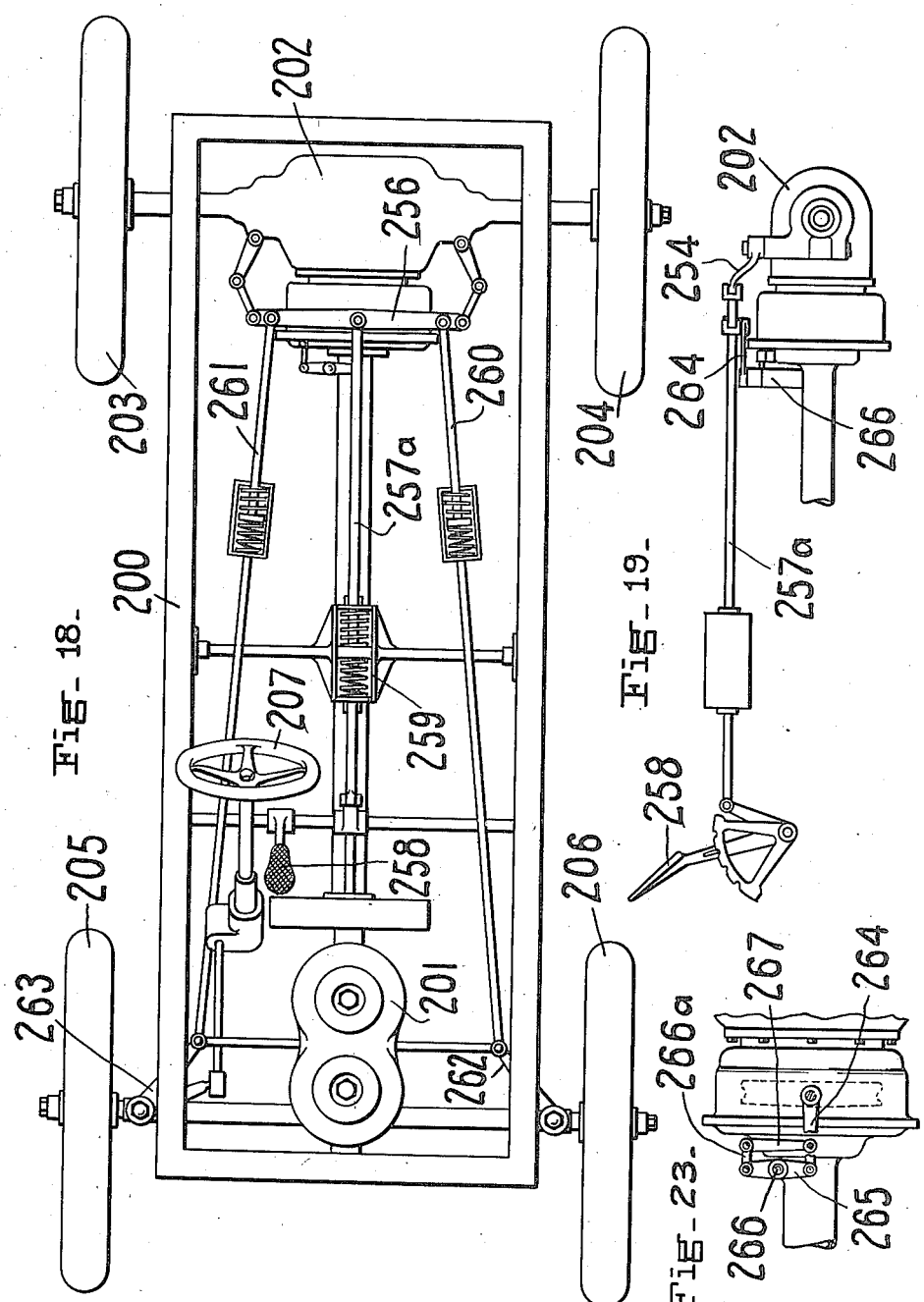

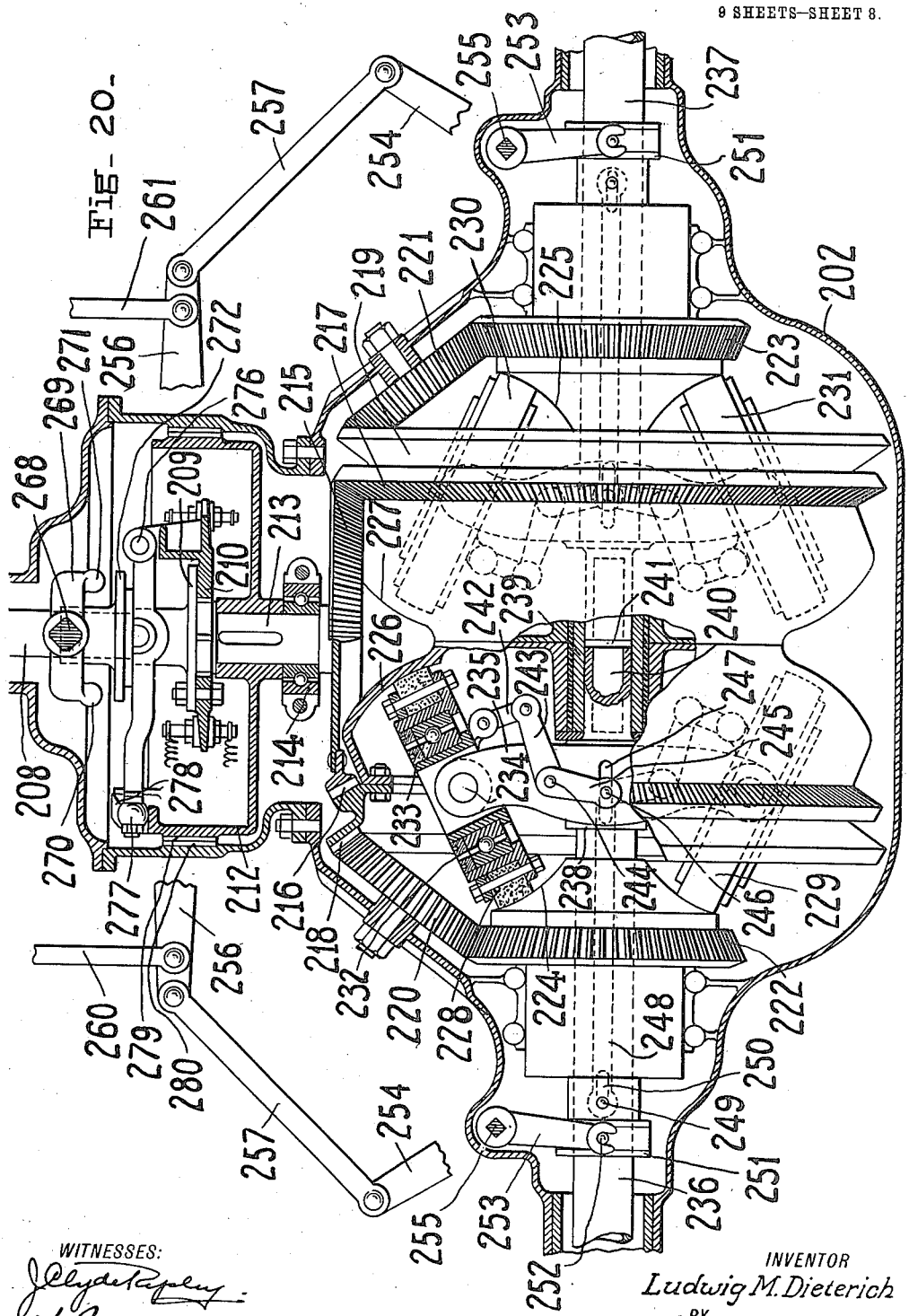

L. M. DIETERICH.
VARIABLE POWER TRANSMITTING AND CONTROLLING MECHANISM.
APPLICATION FILED MAR. 18, 1908.

1,063,244.

Patented June 3, 1913.
9 SHEETS—SHEET 9.

WITNESSES
J. Clyde Ripley.
K. Brenner.

INVENTOR
Ludwig M. Dieterich.
BY
W. H. Barker.
ATTORNEY

UNITED STATES PATENT OFFICE.

LUDWIG MARIA DIETERICH, OF KANSAS CITY, MISSOURI.

VARIABLE-POWER TRANSMITTING AND CONTROLLING MECHANISM.

1,063,244.   Specification of Letters Patent.   Patented June 3, 1913.

Application filed March 18, 1908. Serial No. 421,805.

*To all whom it may concern:*

Be it known that I, LUDWIG MARIA DIETERICH, a citizen of the United States, and a resident of Kansas City, in the county of Jackson and State of Missouri, (whose post-office address is 2507 East Twelfth street, Kansas City, Missouri,) have invented certain new and useful Improvements in Variable-Power Transmitting and Controlling Mechanism, of which the following is a full, clear, and exact description, whereby any one skilled in the art may make and use the same.

The invention as indicated by the title relates to variable power transmission and more particularly to a mechanism in which the power is positively utilized with reference to a driven member or members under predetermined conditions or is automatically controlled to give varying speed ratios dependent upon the initial power and the resistance of the driven members.

The objects of the invention are to provide a mechanism which may be interposed between the power or driving mechanism and the work delivering or driven mechanism embodying the principles of a positive transmission at variable speeds.

A further object is to provide a positive transmission of power from a driving to a driven member through mechanism positively or automatically controlled to vary the speed ratio between the driving and driven members dependent upon the resistance of the driven member.

A further object is to provide between a rotary driving member and a rotary driven member, a mechanism which will transmit the movements of the driving member to the driven member through a positive rolling contact.

A still further object is to provide a mechanism in which the change of speed ratios between a driving and driven member may be varied from zero to the maximum degree without appreciable loss of power and through positive rolling connections.

Figure 21:
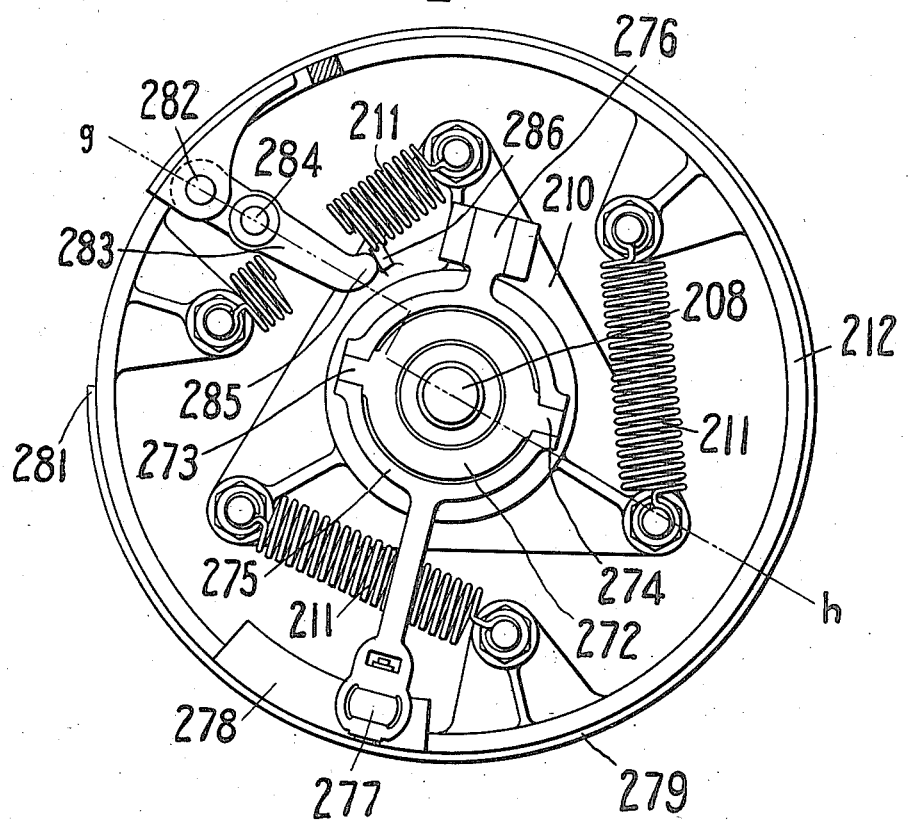
Figure 22:
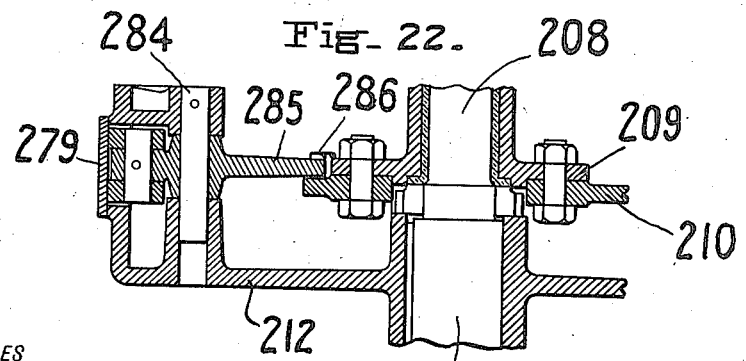

Referring to the drawings: Figures 1 to 7 inclusive are diagrammatic views for explaining the principle of operation of the mechanism. Fig. 8 illustrates in partial section a simple form of the mechanism and one means of applying the invention in mechanical form between a driving and driven shaft. Fig. 9 is a partial sectional view looking in the direction of the arrow of Fig. 8 illustrating the lever and link mechanism for controlling the angular position of the intermediate disk. Fig. 10 illustrates in partial horizontal section the embodiment of the invention between a driving shaft and a two part driven shaft where speed ratios and the power transmission may be varied as to the sectional shaft. Fig. 11 is a detail plan view of one of the intermediate disks on the line $a$—$b$ of Fig. 10. Fig. 12 is a vertical sectional view through the driven shaft of Fig. 10 on the line $c$—$d$ of said figure showing the controlling levers for the intermediate disks. Fig. 13 is a vertical sectional view showing one of the shaft link and yoke connections employed in Figs. 10 and 12. Fig. 14 is a transverse sectional view showing the intermediate disks in edge view with their link connections. Fig. 15 is a plan view of the equalizer lever and connecting links partially shown in Fig. 10. Fig. 16 is a partial sectional view on the line $e$—$f$ of Fig. 10 showing the equalizer bar and yoke. Fig. 17 is a side view of the part shown in Fig. 16 with a portion of the yoke removed. Fig. 18 is a plan view of a vehicle chassis illustrating one application of the mechanism. Fig. 19 is a side view somewhat in diagram of the speed controlling lever and link and lever connections. Fig. 20 is a horizontal sectional view through the casing and rear axle illustrated in Fig. 18 with a portion of the lever and link connections broken away. Fig. 21 is a plan view of the automatic brake and connections illustrated in section in Fig. 20. Fig. 22 is a partial detail sectional view on the line $g$—$h$ of Fig. 21. Fig. 23 is a top plan view with parts broken away to show the link and lever connections of control illustrated in Figs. 18, 19 and 20.

In describing the present invention, it is necessary to consider devices now well-known in the art for transmitting motion from one rotary member to another and transmitting power from the driving to the driven member at varying degrees of speed. Gearing has been employed for giving a positive transmission and gears have been utilized, in various forms, to vary the speed between two rotary mechanisms, either by direct gearing or through what is commonly known as epicycloidal or sun and planet gearing. It has also been common practice to utilize a rotating disk on a driving member, and a corresponding rotating disk upon the driven member, which driven disk may be moved toward or away from the center of rotation of the driving disk to give varying speed ratios between said members. It has also been a practice to utilize a driving and driven disk with an intermediate friction disk the axis of which may be tilted to give a varying speed ratio between said driving and driven disks. The present invention differs materially from all of these systems in that it employs a positive rolling contact which might be termed epicycloidal in its action.

Briefly the present invention contemplates the use of a rotary disk having angular and progressive motion, induced by two rotating disks, and might be said to come under the general characteristics of planetary or epicycloidal gearing. For a clear understanding of the principle of operation and results attained, there is shown in the series of diagrams, Figs. 1 to 7 inclusive, the general principle of operation involved.

Figure 1:
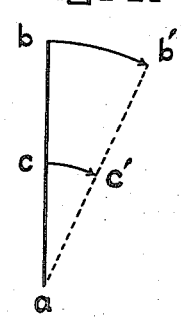
Figure 2:
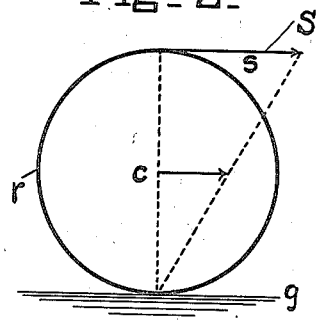
Figure 3:
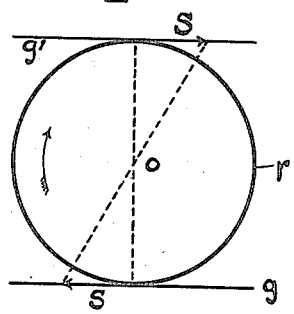
Figure 4:
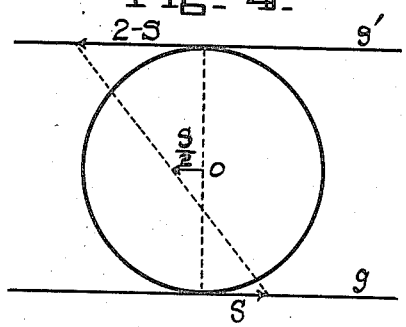
Figure 5:
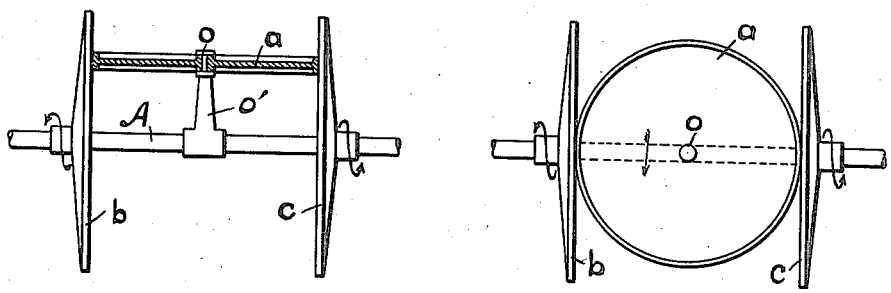
Figure 6:
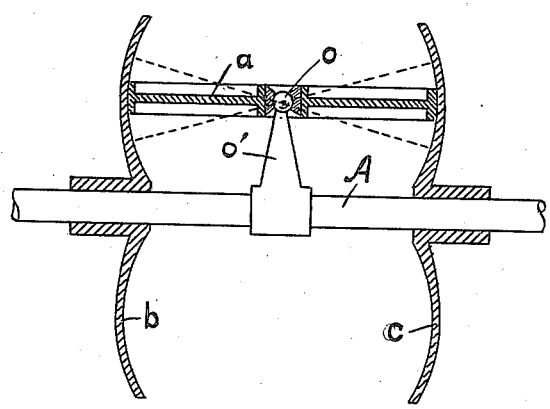

Referring to Fig. 1, it is, of course, apparent and a well-known kinematic fact, that a point $b$, of a lever pivoted at $a$, and turned a certain angle will travel twice as far as a point $c$, which lies in the middle between the pivot $a$, and point $b$, or that the distance $b\ b'$, will be twice the distance $c\ c'$. Referring to Fig. 2 and applying the above principle, it is likewise apparent that with a roller $r$, if rolled on a plane by pulling a strap S, attached to and wound about its periphery, parallel to the plane $g$, the distance moved by the center $c$, of the roller is one-half the distance $s$, traveled or unwound by the strap. Referring to Fig. 3, it is likewise apparent that with a roller $r$, contacting between two parallel planes $g\ g'$, the center $o$, of the roller $r$, will remain stationary if the two planes $g\ g'$, are moved in opposite directions with the same speed S. Referring to Fig. 4, it appears that if one of the planes $g'$, should move twice as fast (2/s), as the plane $g$, the center $o$, of the roller will move in the direction of the faster moving plane $g'$, with half the speed of the differences S, between the two boards. This is obvious from a principle shown in Figs. 1 and 2. Referring to Fig. 5, if instead of two parallel planes, two disks $b$, and $c$, are placed in contact with the roller or disk $a$, and the two disks $b$, and $c$, are rotated in opposite directions but with the same speed, the disk $a$, will rotate on its axis $o$. The axis $o$, however, which is formed on an arm $o'$, secured to a shaft A, will remain stationary. If, however, one of the two disks should revolve faster than the other one, the axis of the third disk $a$, will move in the same direction as the faster rotating disk or in other words, the arm $o'$, will revolve with the common axis A. Referring to Fig. 6, if the two driving disks $b$, and $c$, are so formed that the driven disk $a$, will always be in contact with same and it is oscillated on its center $o$, we have the following conditions: If the disk $a$, is parallel to the axle or shaft A, and the two disks $b$, and $c$, are rotating in opposite directions at the same speed, the same condition exists as in Fig. 3 and the axle or shaft A, will not turn, as the center $o$, of the disk $a$, and the arm $o'$, attached to the shaft A, remains stationary. If, however, the disk $a$, is shifted into angular position with reference to the axis of the shaft A, this disk $a$, will be driven with two different speeds as shown in Fig. 4, as it is on one side in contact with a smaller circle of one driving disk and on the other side with a larger circle of the second driving disk. Under these conditions, the axle or shaft A, will rotate in the direction of the driving disk which has the larger circle of contact with the disk $a$, owing to the revolution of said disk $a$. The greater the angularity of the disk $a$, the greater will be the difference in the driving diameters of the two disks $b$, and $c$, and consequently the greater will be the speed of rotation of the axle or shaft A, due to the increased speed of revolution of the disk $a$. It follows, therefore, that the axle or shaft A, may be rotated forward or backward with any desired speed by changing the angular position of the central disk $a$, provided the two driving disks rotate constantly at the same speed but in opposite directions. This is the mechanical or kinematic principle which forms the basis of the present invention.

Figure 7:
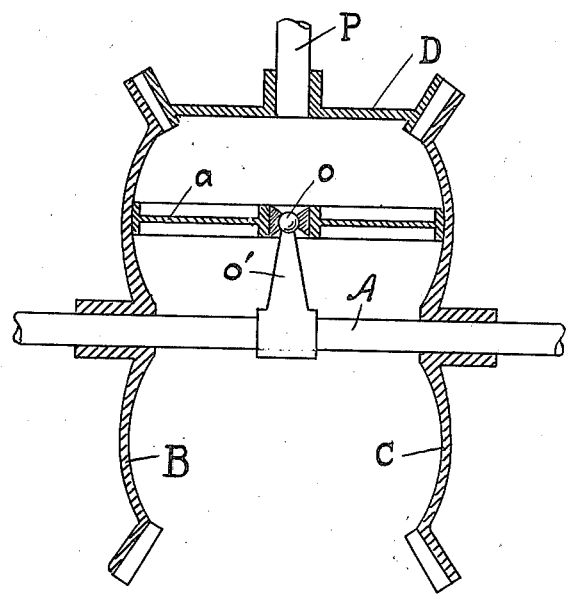

Fig. 7 shows in diagram the above outlined principles as applied mechanically to the mechanism hereinafter described. In this diagram, a driving shaft P, drives the two disks B, and C, through a gear or other driver D, so that they rotate in opposite directions with reference to a common axis or shaft A. Secured to the shaft A, is an arm $o'$, which forms a support or a journal $o$, upon which a disk $a$, is mounted, which disk has its periphery in contact with the driving disks B, and C, and may be oscillated on its axis with reference thereto.

Having described in connection with the above noted diagrammatic views, the general principle of operation of the device in its simple form, attention is now directed to Figs. 8 and 9 which illustrate a simple mechanical embodiment of the mechanism. In these figures, the numeral 1, denotes a casing of spherical form provided with a cover 2, having a neck 3, within which there are arranged antifriction bearings 4, 5, of any suitable character for supporting the main driving shaft 6. At the inner end of the driving shaft 6, is arranged a driving member 7, which as illustrated herein consists of a bevel gear meshing with a pair of opposed bevel gears 8, and 9. The inner surfaces of the gears 8, and 9, are so formed that they will always be in contact with an intermediate driven disk 10, even when said disk 10, is oscillated on its center axle 11. The gears 8, and 9, are suitably mounted to rotate in antifriction bearings 12, 13, adjustably arranged within the spherical casing 1, and each gear is backed up by a thrust-bearing 14, 15. Extending coincident with the common axis of the gears 8, and 9 is a driven shaft 16, which, as shown herein, is of tubular form and has secured to it a hub and arm 17, all supporting a ring 18, which through the axle 11, supports the intermediate disk 10. Antifriction bearings 19, 20, provide for the free-running of the disk 10, with reference to the concentric supporting ring 18. An arm 21, is secured to the shaft 11, or the ring 18, and is pivotedly connected by a link 22, through a pin 23, with a controlling rod 24, the latter extending through the tubular shaft 16, to a sliding collar 25, to which it is secured by a pin 26. The collar 25, has an annular groove 27, within which fit the trunnions of a yoke 28. This yoke 28, is pivoted in the casing 1, as at 29, (see Fig. 9) and its shaft extends beyond the casing and may be rotated by a lever of any convenient form. From the above description, it will be seen that the disk 10, is actually clamped in running contact with the two driving disks or gears 8, and 9, which are driven in opposite directions at the same speed by the driving shaft 6. From the examples given in connection with the diagrammatic views, it is apparent that the intermediate disk 10, may through the links and levers controlled by the yoke 28, be held in a position parallel with the axis of the shaft 16, or may be tilted upon its axis of rotation 11. If so tilted, one of its sides will occupy a position at a greater or less distance from the center of rotation of one of the driving gears and thereupon the disk 10, will be compelled to revolve about the common axis of said driving disks and will consequently rotate the shaft 16, either forward or backward depending upon the position of deflection of the intermediate disk 10, with reference to its axis of rotation 11.

In Figs. 10 to 17 inclusive the invention is illustrated in a form embodying the same general principle of operation as defined in connection with Figs. 8 and 9 and the diagrams Figs. 1 to 7 inclusive, but so arranged that the power and speed of the driving shaft may be transmitted to a sectional shaft requiring differential conditions. In these figures to be described there is also embodied an automatic mechanism for controlling and varying the speed between the driving and driven shafts and said mechanism also includes features of automatically varying said speeds dependent upon the resistance to the driven shafts relatively to the driving effect of the driving shaft. In mechanical devices of all classes it has been common practice to utilize what is commonly known as a balance gear or differential gearing for securing differential speed ratios and in the mechanism now described the invention is adapted for giving such ratios. In these figures the numeral 30, denotes the body part of a substantially tubular casing having a transverse tubular extension 31, within which casing the entire mechanism is mounted. Briefly, a main driving shaft 32, through mechanism hereinafter described, drives through a spur gear 33, meshing with a spur gear 34, and a bevel gear 35, the sectional driven shaft having sections 40 and 44. The bevel gear 35, meshes with two bevel gears 36, and 37, which form the driving members for a pair of driven disk members 38, and 39. The disks 38, and 39, are suitably mounted upon one section 40, of a tubular shaft, the inner end of which is suitably mounted in an antifriction bearing 41, arranged within the hub of the driving gear 36. The driving gear 36, is provided with an extended hub 36ª, to which is keyed the hub of a driving gear 42. The hub of this gear 42, is provided with an antifriction bearing 43, for the inner end of the section 44, of the divided shaft. The gear 42, meshes with a gear 45, which in turn meshes with a gear 46, the gears 42, and 46, as in the case of the gears 36, and 37, form driving members for a pair of intermediate disks 47, and 48. These disks 47, and 48, are also suitably mounted upon the shaft section 44, their arrangement being identical with that of the disks 38, and 39. It will thus be seen that the shaft section 40, may under certain conditions be driven at a different speed to the shaft section 44. The main shaft 32, is provided with an antifriction bearing and support 49, at its entrance to the casing 31, and terminates in a flange 50. Overlying this flange 50, is a spider 51, having a plurality of arms 52, and with an annular projection 53, on its lower face which overlies the edge of the flange 50, and a flange 54, formed upon an interiorly threaded nut 55. The spider 51, and the nut 55, are clamped on opposite sides of the flange 50, by suitable nuts and bolts. Extending within the screw-threaded nut 55, is a quick pitch screw 56, formed on the upper end of the shaft section 57. This shaft section 57, is provided with a collar or flange 58, to which is bolted a spider or disk 59, substantially the same in form as the spider 51. This shaft section 57, below the collar 58, is of angular cross section as at 60, and extends within and is slidably mounted with reference to a sleeve 62. The sleeve 62, is mounted in a bearing 63, and has a tapered end 64, to which is keyed the spur gear 33. Indirectly the sleeve 62, is supported by the antifriction bearing 65, arranged upon the hub of the spur gear 33. Below the flange 58, is arranged a thrust-bearing 66, to take up the end thrust of a sleeve 67, which fits over the tubular sleeve 62, and is axially movable thereon, it being understood that the thrust-bearing 66, moves with the sleeve 67. This sleeve 67, is held against rotation by a projection 68, extending into a slot 69, the former being located upon the inner end of a yoke shaft 70. The spider 51, is connected to the spider 59, by stiff coil springs properly weighted for the duty required in any particular design of the mechanism. The two spiders through the springs form a resilient connection between the driving shaft section 32, and the driving shaft section 62, and prevent undue stress between the main driving shaft and its source of power and the driven members of the mechanism. These springs are normally of such tension as to effect the proper drive between the driving shaft and the driven shaft under normal conditions. If, however, undue load is placed upon the driven shaft, the springs will expand and thereupon, the spider 59, will move relatively to the spider 51, dragging back and extending the springs. This relative movement of the spiders will cause a relative rotation of the shaft 57, and through its screw-threaded connection with the nut 55, it will be forced downward into the tubular shaft 62, carrying with it the sleeve 67. This sleeve 67, is provided with a beveled tapered face 71, which as it is thrust backward will abut against one of the arms 72, or 73, of a forked lever 74, secured to the squared end 75, of the yoke shaft 70. The yoke 76, secured to the outer end of the shaft 70, terminates at its upper end in a universal joint 77, through which it is connected to an equalizer bar 78. At each end of the equalizer bar 78, is pivoted a link 79, and 80, which connects said equalizer bar with levers 81, and 82, which in turn are respectively connected with shafts 83, and 84, having bearings in the casing 30, and projecting within the same. The lower ends of the shafts 83, and 84, have secured to them yokes 85, and 86, which through trunnions 87, and 88, control the position of the axially movable sleeves 89, and 90. These sleeves 89, and 90, are mounted respectively upon the driven shaft sections 44, and 40, and are slidable thereon. Secured to the shaft section 44, is a hub 91, provided with transversely extending arms 92, and 93, which form the support and bearings 94, and 95, upon which the disks 47, and 48, may be tilted with reference to the driving gears or disks 46, and 42. A lever 96, controls the position of the disk 48, while a lever 97, controls the position of the disk 47. These two levers through pivoted links 98, and 99, are connected with a transverse pin or shaft 100, which extends through a slotted opening in the shaft 44, and is connected with the sliding collar 89, through a pin 101, and rod 102. As the connections for the disks 38, and 39, are identical with those described in connection with the disks 47, and 48, it is believed that no further description thereof is required. From the above arrangement of links and levers, it will be seen, that a movement of the equalizer bar 78, will simultaneously change the angular position of the intermediate disks 47, and 48, and the intermediate disks 38, and 39, which transmit motion to the two sections of the driven shaft 44, and 40. Centrally connected to the equalizer bar is a pull rod 103, and if this is moved, both sets of intermediate disks will be moved to the same extent. If, however, one of the pull rods 104, or 105, is moved to change the angular position of the equalizer bar 78, the relative angularity in position of the two sets of intermediate disks 47, and 48; 38, and 39, will be correspondingly changed through the link and lever connections and thereupon one shaft section will have a differential movement with reference to the other.

It will be seen from the above described arrangement of parts that a pull upon the rod 103, indicated as a (+), movement on the arrow in Fig. 15 will move the equalizer bar forward, simultaneously moving the two sets of intermediate disk members 38, 39, and 47, 48, into the position indicated by the axial dotted line marked (+). This will give a rotary movement to the axle sections 40 and 44 in the (+) direction indicated by the arrow so marked in Fig. 10 and the relative speed of said sections to the driving shaft, will be increased or diminished depending upon the angularity of the disks. If, however, the rod 103, is moved backward as indicated by the (—), direction of the arrow in Fig. 15, the disks will assume a position indicated by the axial dotted line marked (—), in Fig. 10, and thereupon the shaft sections will be rotated in the (—), direction as indicated by the arrow in Fig. 10. It is to be understood, of course, that the position of the parts illustrated in full lines in Fig. 10, indicate the zero position, where no motion is transmitted from the driving shaft 32, to the driven shaft sections 40, 44. It is also apparent from the above description that the angularity of the intermediate disks may be automatically varied due to the resistance offered by the driven shaft sections 40, 44, and that with a drag of the driven mechanism and the driven spider 59, there will be such a relative change of position between said spider and the spider 51, as to induce a movement of the equalizer bar 78, through its connecting yoke 76, shaft 70, forked lever 74, and moving collar 67. Thus the resistance will automatically lower or increase the speed of the sectional driven shafts 40, and 44, accommodating the speed automatically to the driving effect of the driven shaft 32. This effect, if one shaft section is unduly retarded, will automatically vary the speed of the second shaft section, but, in any tendency of change of speed due to undue resistance or overload upon the driven shaft members, there will be an automatic shifting of the intermediate disks toward the zero position, thus always giving a maximum torque or driving effect upon the driven shaft sections with a constant driving power upon the driving shaft.

In order to illustrate the mechanism in a full embodiment, containing all of its various features of advantage, there is shown in Figs. 18 to 23 inclusive, an adaptation to driving mechanisms for vehicles, where the differences in resistance to the driving force probably vary to as great an extent as in any other class of mechanisms. Referring to Fig. 18, there is shown in plan view an automobile chassis embodying a frame 200, upon which is suitably mounted a motor 201, which through a suitable shaft is connected with the mechanism embodying the present invention, contained in a housing upon the rear axle, and indicated as 202. There are driving wheels 203, 204, connected with the rear axle, and steering wheels 205, 206, which are controlled as to direction by a steering mechanism 207. Within the housing 202, extends a main driving shaft 208, which is suitably connected with the engine or power developing mechanism and terminates in a flange 209, to which is secured a spider 210. This spider 210, through spiral springs 211, is connected with a drum 212. The latter is keyed to a shaft section 213, supported in antifriction bearings 214, and forming the direct connection with a driving gear 215. This beveled gear 215, meshes with a beveled gear 216, and a beveled gear 217, rotating said gears positively in opposite directions. Interiorly or otherwise connected with the gears 216, 217, are beveled gears 218, 219, which in turn mesh with idler gears 220, 221, suitably supported within the housing 202. These idler gears 220, 221, in turn mesh with gears 222, 223, which have secured to or integrally formed therewith, curved driving surfaces 224, 225. Secured to or integrally formed with the gears 216, 217, are curved driving surfaces 226, 227. Between the curved driving surfaces 224, 226, are arranged a pair of intermediate disks 228, 229, and between the driving surfaces 225, and 227, are arranged intermediate driving disks 230, 231. The several intermediate disks are of ring form carried by an inner ring or frame 233, suitably supported for axial movement upon an axle 234, borne in the ends of supports 235. As the several intermediate disks are all supported in a similar manner only one set of disks is described in detail herein. The supports 235, extend upon opposite sides of the driven shaft sections 236, 237, and are secured thereto through hubs 238. The shaft section 236, is hollow and extends through the hub of the gear 222, to the medial line of the housing where it is provided with an exterior bearing 239, arranged within the hubs of the members 226, 227, and with an interior bearing or connection 240, arranged in the form of a nipple which extends into the shaft section 236, and into the shaft section 237, with an intermediate flange 241, supporting said shaft sections. The intermediate disks 228, 229, are controlled as to axial position with reference to the common axis of the driving surfaces 224, 226, by links 242, pivoted respectively to the supporting rings 233, and the outer end of a lever 243, which is pivoted to the supporting arm 235 as at 244. Levers 245, secured to the levers 243, and connected by a pin 246, passing through a slot 247, in the hollow shaft sections, connect through a rod 248, pin and slot connection 249, 250, with sliding collars 251. These collars 251, through trunnions 252, and yokes 253, are controlled as to axial position, along the shaft sections, by levers 254, having bearings 255, in the housing and pivotally connected to an equalizer bar 256, by links 257. The equalizer bar 256, is suitably mounted over the forward end of the housing and is manually controlled as to position by a rod 257ª, connected with a foot lever 258, through a resilient cushion 259, mounted in a suitable housing, although said equalizer bar 256, may under certain conditions hereinafter defined move irrespective of the position of the foot lever. At either end of the equalizer bar 256, are arranged rods and resilient connections 260, 261, connected with the arms 262, 263, of the steering pivots of the steering wheels 206, 205. so that a deflection of the steering wheels will deflect the equalizer bar 256, no matter what its pivoted center of oscillation may be.

Pivoted below the equalizer bar 256, is a link 264, which, at its opposite end is connected to a lever 265, pivoted as at 266, to the housing 202. The opposite end of the lever 265, is, through a pivoted link 266ª, connected to and moves a lever 267. This lever 267, is connected with a shaft 268, which extends within the housing and controls a forked lever 269, similar to the lever 74, described in connection with Fig. 10.

This forked lever 269, has bearing points 270, 271, which overlie an axially movable collar 272. This collar 272, is movable upon the shaft 208, and is provided with trunnions 273, 274, fitting within recesses formed on diametrically opposite sides of a pivoted cam lever 275, which is pivoted to the spider 210, as at 276, and at its outer end is provided with an antifriction roll 277, which rides along the surface of a cam 278, the latter formed on the upper edge of the drum 212. The purposes and function of the forked lever 269. with its link and lever connections to the sliding collars 251, is to impinge against the collar 272, and correct the position of the levers and collars noted. Whenever there is an abnormal tendency of the drum 212, which is connected with the driven mechanism, to drag with reference to the driving spider 210, the lever 275, will be forced upward carrying with it the flange 272, owing to the rise of the roll 277, upon the cam 278. This movement will bring the flange 272, into contact with one of the bearing points 270, 271, of the forked lever 269, and will therefore, vary the angular position assumed by the equalizer bar 256, always tending to move said bar into a position where the intermediate disks of the driven mechanism will assume positions of like angularity and will tend to force said intermediate disks toward a neutral position reducing the ratio of speed of the driven shaft sections. The drum 212, also has a further function, in that it is provided with means, for preventing racing or undue speed of the driven mechanism with reference to the driving mechanism. About its periphery is arranged an expansible brake band 279, arranged to be expanded against a brake surface 280, the latter arranged within the housing. This brake band is secured at one end as at 281, to the drum 212, and at its opposite end is pivoted as at 282, to a lever 283, which, in turn, is pivoted to the drum as at 284, and has one end 285, abutting against a lug 286, formed upon the spider 210. Under normal conditions of drive, from the driving shaft 208, to the driven mechanism, the intermediate cushions or springs 211, are under more or less tension and therefore, the lug 286, does not bear with any degree of force against the end of the lever 283. Therefore, the expansible brake is ineffective. If, however, the driven mechanism due to decreased resistance, should have a tendency to overrun the speed of the driving shaft 208, the drum 212, would rotate relatively faster than the spider 210, and thereupon the tension of the springs 211, would be decreased and said springs would be placed under compression. This action will bring the lug 286, on the spider 210, actually into contact with the long arm of the lever 283, causing said lever to expand the brake band 279, against the coöperating brake surface of the housing. This automatically reduces the speed of the driven mechanism and prevents the transmission of undue shock and jar to the main driving mechanism.

From the above description, it is apparent that the foot lever 258, may be set to any predetermined speed desired and that with a given driving effect, the speed varying mechanism will automatically maintain the speed which is predetermined, unless, owing to excessive load upon the driven wheels, the mechanism automatically adjusts itself for a lower speed with a consequently greater effect or torque upon the driving wheels of the vehicle. Therefore, the mechanism may be set for any initial speed and will, within the limits of the power of the driving mechanism, give speeds corresponding to the resistance offered to the driving wheels of the vehicle. A further apparent advantage resides in the differential or balance gear for the two driving wheels 203, 204. As the equalizer bar 256, is connected with the steering pivots, it is apparent that the intermediate driving disks of the speed changing mechanism, will be changed as to angular position by a deflection of the steering wheels. There will be no loss of power in driving the vehicle in a circle as the deflection of the intermediate disks will always give the proper speed ratio between the inner driving wheel of the vehicle and the outer driving wheel of the vehicle. Both wheels will positively drive, there will be no undue increase in speed or spinning due to slippage of one of the wheels by virtue of retarding the speed of the outer wheel. Consequently, there will be no tendency to skid and no loss in driving power while turning corners.

The adaptation of the mechanism in Figs. 18 to 23 has been described in detail to illustrate the flexibility of the system embodying the invention herein described. It further shows the possibilities of coalescing and simplifying in a single unit, the various complications of mechanisms heretofore employed for the same purposes.

The mechanism as described eliminates the use of mechanism for varying the speed and power conditions of the source of power or engine. It further eliminates the use of an intermediate change gear mechanism, and still further eliminates the use of a specific form of balance or differential gear. With the mechanism described, and with an engine of constant speed, say 1,000 revolutions per minute, which may be directly connected with the mechanism of the rear axle, the entire control of the vehicle is taken care of with a single foot lever and the steering wheel for controlling the direction of movement. The balancing effect, of the two driving wheels, is automatically taken care of with a positive, efficient drive, at automatically variable speeds and with a maximum torque of the driving wheels, proportional to the constant power delivered by the driving mechanism. At first sight, it might appear that the mechanism embodied only the principles of friction drive. It is believed, however, that its real operation is clearly identified, by the diagrammatic views, and description thereof, as a positive rolling drive connection.

It has been found by experiment that to secure high efficiency, certain materials are more advantageous than others. In fact, in carrying out the invention, one or both of the power transmitting surfaces, intermediate the driving disks and the intermediate disks, when provided with polished cork have advantages. First of all, cork is impervious to oil and maintains its great static co-efficiency even when immersed in oil. It has great elasticity and compressibility and this, makes the contact, even under slight pressure, actually a surface contact and a surface drive, without internal slippage, in contradistinction, to a line contact or point drive, which is the predominant feature in rolling or friction drive surfaces of purely metallic construction. While in the various forms of the device, there has been shown, gears intermediate the driving shaft and the driving disks, which in turn drive the intermediate disks, it is a fact, that cork, of the character described, against metal, or cork against cork have been utilized most successfully, giving substantially a positive rolling contact and positive drive with no appreciable loss. It has also been found from experiments that the dynamic co-efficient of friction, with cork against cast iron is as high as (.35), as compared with steel against bronze under the same conditions, where the co-efficient of friction was (.15). Under a contact pressure of about 50 lbs., experiments and tests have shown that the static co-efficient of friction with polished cork against polished cast iron running in oil as hereinabove described averages about (.89). This is actually more than double the dynamic co-efficient of friction above stated.

Of course, it is to be understood that, while the invention is shown and described herein, in connection with specific uses. it may be applied to any and all forms of devices in which it is desired to vary the speed between the driving and driven mechanism or vary said speed either directly or automatically dependent upon the relative driving effect and resistance offered by the driven member or members with respect to the driving mechanism. It is not desired to limit the invention to the specific forms shown and described herein, and it is understood that various modifications and adaptations might be made without departing from the spirit or intent of the invention.

What I claim as my invention and desire to secure by Letters Patent is:

1. In combination, a driving member, a plurality of members driven thereby at the same speed, in opposite directions of rotation and a rotary driven member, intermediate said driven members and deriving rotary and revoluble motion therefrom.

2. In combination, a driving member, a plurality of members driven thereby at uniform speeds, in opposite directions of rotation, and an intermediate rotary driven member deriving purely rotary or rotary and revoluble movements therefrom.

3. In combination, a driving member, a plurality of members driven thereby at uniform speeds, in opposite directions of rotation, a rotary and revoluble driven member intermediate said driven members, deriving motions therefrom, and means for holding last mentioned driven member in position to derive purely rotary motion, or changing and then maintaining the positon of said driven member to derive additional revoluble motions from said driven members moving in opposite directions.

4. A driving member, a plurality of members driven thereby at uniform speeds, in opposite directions of rotation, a rotary driven member, intermediate said oppositely rotating driven members deriving motion therefrom and means for varying the individual driving effect of either of the driven members with respect to the intermediate driven member.

5. A primary driving member, a pair of members deriving motion therefrom at uniform speeds in opposite directions of rotation, a driven member in contact with both of said driving members, and means for holding said driven member in a contacting position to receive an equal driving effect from both of said driving members, or for varying the contacting position of said driven member whereby the driving effect of said driving members will cause revoluble motion of said driven member.

6. In a device of the character described, a driving shaft, a driving member secured thereto, a plurality of opposed driving members driven thereby in opposite directions of rotation and at uniform speed, a driven member, intermediate said opposed driving members, adapted for rotary and revoluble movements with respect to the common axis of said opposed driving members, dependent upon its angular position with reference to said common axis, and means for varying the position of said intermediate driven member.

7. In a device of the character described, a driving shaft, a driven shaft, a pair of driven members deriving motion from said driving shaft and co-axially arranged with reference to said driven shaft, said driven members moving in opposite directions of rotation at uniform speed, an intermediate rotary driven member in contact with both of said driving members, said driven member secured to the driven shaft and means for varying the angular position of the intermediate driven member with reference to the common axis of the two driving members.

8. In a device of the character described, a driving shaft, a driven shaft, a pair of driven members deriving motion from said driving shaft and co-axially arranged with reference to said driven shaft, said members rotating in opposite directions at uniform speed, a plurality of intermediate rotary driven members in contact with both of said driving members, said driven members secured to the driven shaft and means for varying the angular position of the intermediate driven members with reference to the common axis of the two driving members.

9. In a device of the character described, a driving shaft, a sectional driven shaft, a plurality of driven members mounted respectively upon the sections of the driven shaft and rotating in opposite directions, a driven disk secured to each section of the driven shaft and deriving rotary and revoluble motions from one set of the driven members, and means connected with the driven disks for varying the revoluble movements thereof.

10. In a device of the character described, a driving shaft, a sectional driven shaft, a plurality of driven members mounted respectively upon the sections of the driven shaft and rotating in opposite directions, a driven disk secured to each section of the driven shaft and deriving rotary and revoluble motions from the driven members and means for respectively varying the revoluble movements thereof, whereby different speeds of rotation may be transmitted to the said driven shaft sections.

11. In a device of the character described, a driving shaft having intermediate relatively movable members, a driven shaft, a plurality of driving members deriving motion from said driving shaft, a rotary and revoluble member deriving motion from said driving members and having operative driving connection with said driven shaft and means for automatically varying the relative speed ratio between the driving shaft and driven shaft.

12. In a device of the character described, a sectional driving shaft, resilient connecting means uniting the sections of the driving shaft, a driven shaft, a plurality of driving members deriving motion from the driving shaft and co-axially arranged with reference to the driven shaft, a rotary and revoluble member deriving motion from said driven members and connected with said driven shaft and connections intermediate said member and the axially movable driving shaft section for automatically varying the position of said intermediate driven member with reference to its driving members.

13. In a device of the character described, a sectional driving shaft, a spring cushion intermediate the sections of said shaft, positive means for axially moving one of said shaft sections with reference to the other, a driven shaft, a plurality of driven members, co-axially mounted on said driven shaft and deriving motion from the axially movable section of the driving shaft, an intermediate driven member contacting with said driven members and mounted upon the driven shaft for rotary and revoluble motions and links and levers connecting said intermediate driven member with the axially movable driving shaft section whereby the position of the former is automatically controlled.

14. In a device of the character described, a prime mover or driver, a main driving shaft, a driven shaft, a plurality of driven members co-axially arranged with reference to said driven shaft, a rotary intermediate driven member interposed between the plurality of driven members, said intermediate member secured to the driven shaft, and connections intermediate said intermediate driven member and the main driving shaft for automatically varying the relative speeds of the driving and driven shafts dependent upon the resistance of the driven shaft to the driving effect of the prime mover.

15. In combination in a device of the character described, a driving shaft, a two part driven shaft, a pair of opposed driving disks on each shaft section, a rotary and revoluble driven disk intermediate each pair of driving disks and connected with the respective driven shaft section and connections intermediate said disks and the driving shaft whereby each axial section is driven irrespective of the relative differences in speed of said axle sections.

16. In combination in a device of the character described, a driving shaft, a plurality of opposed positively driven driving disks rotating at uniform speeds in opposite directions, a driven member co-axially arranged with reference to said driving disks and a rotating disk contacting on diametrically opposite sides with the driving disks and variable as to angular position with reference to the axis thereof.

17. In combination a driving member, a plurality of driven members driven thereby at uniform speeds in opposite directions of rotation, and an intermediate rotary driven member contacting therewith and variable as to its contacting position, said member deriving purely rotary or rotary and revoluble movements therefrom dependent upon its position.

LUDWIG MARIA DIETERICH.

Witnesses:
　SANFORD S. GOWDEY,
　KATE BRENNER.